United States Patent Office 3,445,619
Patented May 20, 1969

3,445,619
STUD WELDING
Frank K. Kelemen, Moorestown, N.J., assignor, by mesne assignments, to Omark Industries, Inc., Portland, Oreg., a corporation of Oregon
Filed July 13, 1964, Ser. No. 381,991
Int. Cl. B23k 9/20, 9/32, 11/04
U.S. Cl. 219—98
10 Claims

ABSTRACT OF THE DISCLOSURE

An electric stud welding gun is provided with a handle guard and a reciprocable chuck, such that the hand guard contains a first insulated welding current conductor and a second insulating welding current conductor is flexibly provided between the first conductor in the hand guard and the reciprocable chuck.

---

Figure 1:
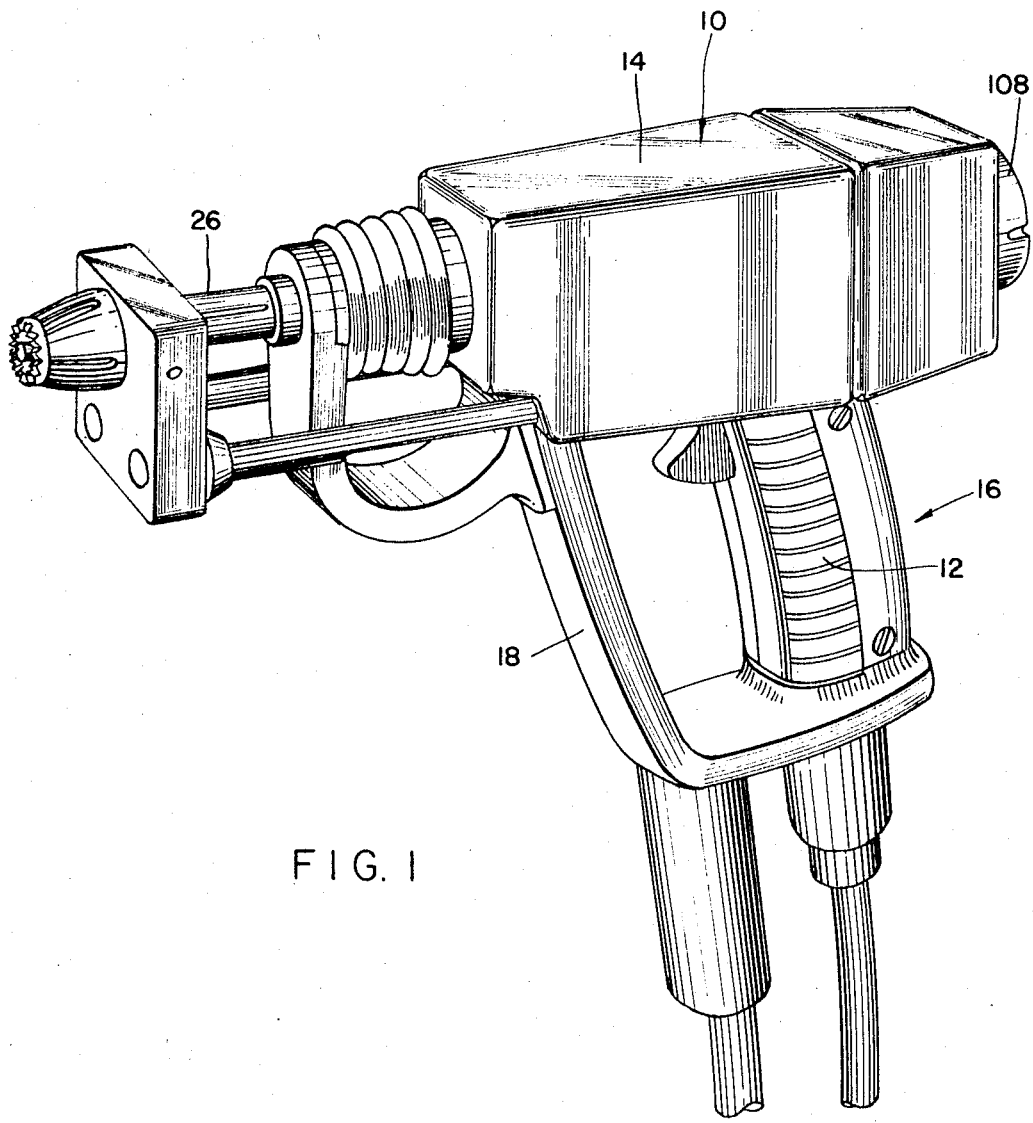

This invention relates to electric arc stud welding apparatus and more particularly to hand-held and operated stud welding devices.

The present invention is particularly concerned with improvements in so-called welding "guns" employed to weld studs by a process in which a stud is initially located in contact with a base workpiece while a current is passed through the junction therebetween, next, is withdrawn from the workpiece to establish a pilot arc, maintained a predetermined distance from the workpiece while a welding arc is produced by welding current flowing across the ionized path established by the pilot arc and finally is plunged against the workpiece in order to unite molten contiguous portions of the stud and workpiece. The handheld gun provides the means for positioning the stud in contact with the workpiece, "lifting" the stud away from the workpiece and then "plunging" the stud into contact with the workpiece; and generally comprises stud-holding means, means for positioning the gun relative to the workpiece, electrically energized actuating means for moving the stud away from the workpiece in "lift" direction, means for moving the stud in "plunge" direction, a switch for initiating a welding cycle, electrical conductors for carrying pilot and welding arc current and current for the controls and actuating means, and controls for determining the length of movement of the stud-holding means during lift and plunge.

An object of the invention is to provide in a stud welding gun of the type described, novel and improved means for controlling the velocity of movement of the studholding means during lift and plunge.

Another object of the invention is to provide control means of the foregoing type which are inexpensive to construct, simple to operate and give dependable, reproduceable results.

Hand-held and operated stud welding devices of the type with which the present invention is concerned are called "guns" because of their resemblance to hand guns and include a barrel, a hand grip and a trigger; but here the resemblance ends especially due to the greater size and weight of the welding devices.

A further object of the invention is to provide a novel and improved stud welding gun construction which is less expensive, lighter and more compact as a result of a housing construction consisting of essentially a single unit; and is safer, easier and less fatiguing to handle and use.

Stud welding guns of the type described are coupled with a welding current supply and control apparatus by two electrical cables, one of which is quite heavy because it carries the welding current; and the gun, as previously noted, must include an electrical conductor for carrying the welding current within the gun structure from the exterior cable (which is not a part of the gun) to the stud which is moved with respect to the gun during the welding operation.

Still another object of the invention is to provide in a stud welding gun structure of the type described, a novel and improved arrangement of welding current conductors which is more durable, lighter, safer and has a greater current carrying capacity.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 2:
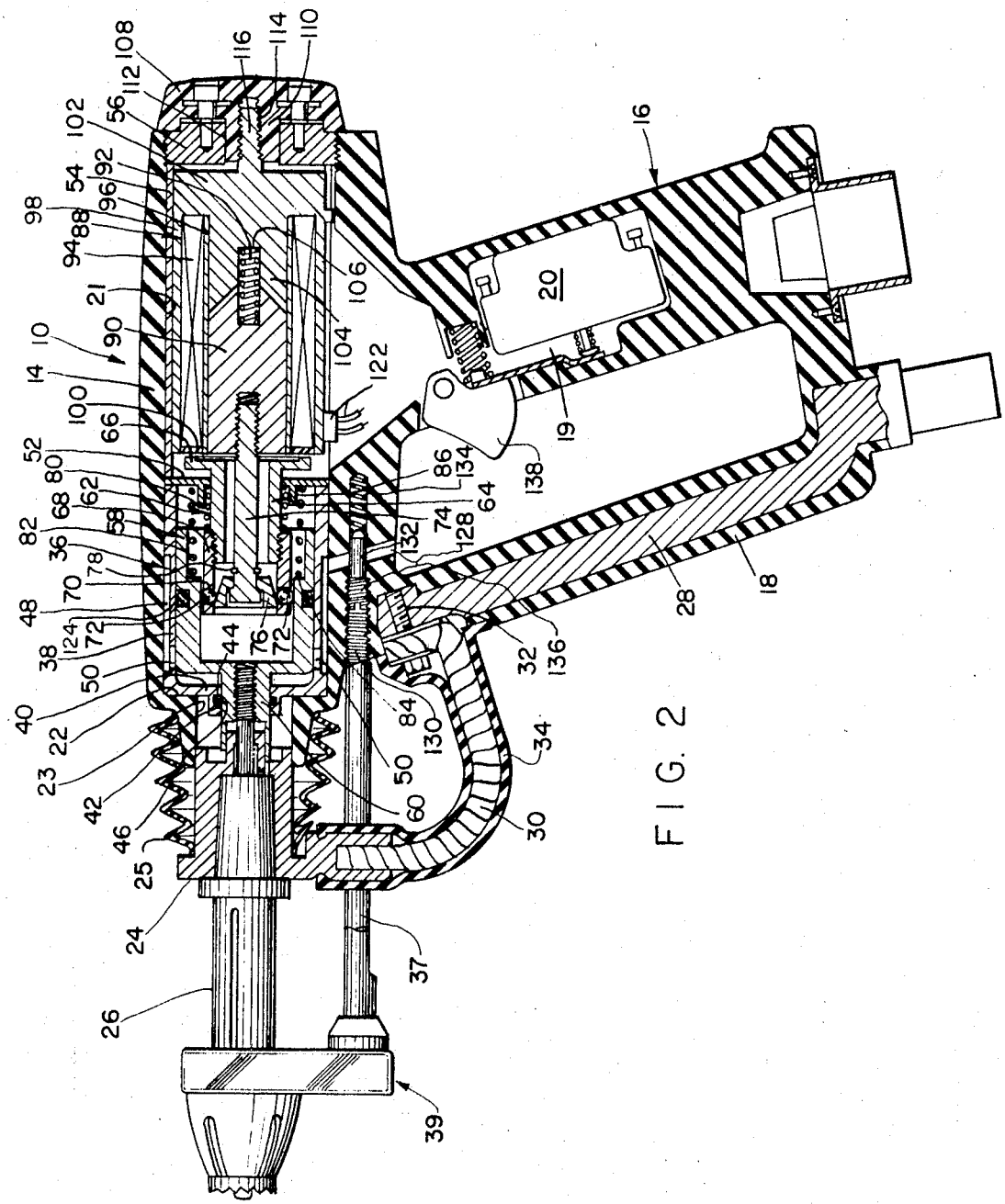

For a fuller understanding of the nature and objects of the invention, reference should be had to the following detailed description taken in connection with the accompanying drawing wherein:

FIGURE 1 is a perspective view of a stud welding gun embodying the invention; and FIG. 2 is an elevational view, partially in section, of the stud welding gun of FIGURE 1, the section being taken along the main longitudinal axis of the gun.

Reference is now made to the drawings wherein there is shown a stud welding gun structure embodying the invention. The gun comprises a housing 10 formed of an electrically nonconducting material, preferably a plastic material of the thermosetting type having high impact strength. Housing 10 is designed to be fabricated by conventional molding methods and comprises a single basic section and a cover section 12 removably coupled with the basic section to provide access to certain of the operating components of the gun enclosed within the housing. The basic section of the housing includes a barrel section 14 having a generally rectangular exterior cross sectional configuration; a handle or handgrip 16, extending radially from one side of the barrel section intermediate its ends at an angle relative to the main axis of the gun; and a guard section 18 extending from the barrel section near the forward end thereof generally parallel with handgrip 16 and joined with the handgrip at the extremity or butt end thereof. Grip 16 is formed with an open recess 19 in one side adapted to be closed by removable cover section 12 which comprises a part of the grip. An important feature of this gun construction is the enclosure of the welding current conductor within guard section 18 rather than in the handgrip so that the handgrip contains only control elements including a trigger switch 20 and conductors comprising the operating and control circuit for the gun and associated apparatus, and can be formed with a relatively small girth better shaped to be held manually. The more comfortable handgrip thus provided, appreciably reduces operator fatigue while guard section 18 cooperates in protecting the operator's hand against flash and splatter during welding operations.

Barrel section 14 is formed with a main longitudinal bore 21, open at both ends and having a generally cylindrical cross section. The forward end of barrel section 14 is tapered and provides a rearwardly facing internal shoulder 22 marking the forward extremity of the larger diameter, major portion of the main bore and a relatively short forward portion 23 of reduced and preferably noncircular cross section. Slidably engaged in forward portion 23 of the bore for axial movement are stud-holding means including a recessed holder 24 in which is engaged means such as a collet 26 for holding a stud. A flexible bellows 25 is secured around the holder and coupled to the holder and gun housing for protecting the holder against splatter and preventing contaminants from entering the gun bore.

Holder 24 is formed of a metal such as steel and is a component of the circuit which supplies welding current to the stud held in collet 26. The other components of this circuit within the gun include a large current capacity conductor 28 formed, for example, of copper, engaged within guard section 18 which is molded around conductor 28 so that the latter becomes an integral portion of the gun structure. Conductor 28 is in the form of an inflexible bar formed at one end with a tapped hole for attachment of a flexible cable and at its other end (near the extremity of the grip and guard section) with a conventional electrical connector adapted to be joined with a cable from a welding power supply. Conductor 28, being a rigid bar around which the housing is molded, is not subjected to bending and/or to wear resulting from movement relative to and within the gun housing in frictional engagement therewith and therefore, is able to carry larger currents without undue heating than is possible with the flexible conductors subject to frictional wear. The gun includes a relatively short flexible conductor 30 coupled at one end with holder 24 and at its other end to conductor 28 by a bolt 32 secured in the tapped hole in conductor 28. Conductor 30 is generally arcuate in shape and may have a high current capacity because of its relatively short length and the fact that it need be constructed to bend or flex in only one plane, and then, only through a very small angle. Conductor 30 is provided with an outer insulating sheath or cover attached at its ends to holder 24 and to the housing at the juncture of barrel section 14 and guard section 18.

The barrel section of the housing includes a pair of axial bores (not shown) in which are engaged a pair of legs 37 mounting a foot 39 for positioning the gun with respect to a workpiece to which a stud is to be welded and for holding a flash guard. Legs 37 are slidably engaged in the bores so as to be adjustable and set screws (not shown) are threaded into the housing for retaining the legs fixed in the desired position.

Engaged within the forward end of main bore 21 against shoulder 22 is a guide member or liner in the form of a cup-shaped sleeve 36 formed of a hard, wear resistant material such as steel and having a generally cylindrical section 38 engaged within bore 21 and a base 40 disposed against shoulder 22 and extending inwardly to a cylindrical axial bore 42 formed with an internal peripheral groove or channel 44 for holding an O-ring 46. The outer peripheral surface of cylindrical section 38 is tightly engaged within bore 21 and is formed with a peripheral recess 48 which cooperates with the housing to form an annular chamber between the sleeve and housing which is preferably air tight. A plurality of radially spaced openings or ports 50 are provided in sleeve 36 near the forward end of recess 48 communicating between the recess and the inside of the sleeve near base 40.

A disc 52 having an axial opening is engaged within bore 21 at the rear of sleeve 36 and divides bore 21 into, essentially, forward and rear chambers. Disc 52 is retained in fixed position with bore 21 by a retaining sleeve 54 engaged within the rear portion of the bore and retained therein by a plug 56 threaded into the open rear end of barrel section 14.

Engaged with barrel section 14 are actuating means and a connecting mechanism or clutch for coupling holder 24 with the actuating means so that a stud, engaged in collet 26, or other form of chuck engated in holder 24, may be moved toward and away from the workpiece as required during a welding cycle. This clutch mechanism is engaged within sleeve 36 and the opening in disc 52 and comprises a ball-engaging barrel 58 slidably engaged for axial movement within cylindrical section 38 of sleeve 36 very much as a piston in a cylinder. Barrel 58 includes a base with a cylindrical shank 60 slidably engaged for axial movement in axial bore 42 and coupled with holder 24. Barrel 58 is also formed of a hard material such as steel and it, holder 24 and sleeve 36 are suitably heat treated so that surfaces in sliding contact are highly resistant to wear.

Slidably mounted for movement coaxially with holder 24 and barrel 58, is a sleeve 62 engaged within barrel 58 and the axial opening in disc 52 and biased toward the forward end of the gun in plunge direction. Sleeve 62 comprises two cylindrical portions secured by threads to one another. These portions are a rear portion 64 engaged in the opening in disc 52 and including a flange 66 located to the rear of the disc and a forward cylindrical portion 68 of enlarged diameter engaged in barrel 58. Portion 68 is equipped with a plurality of recesses 70 and serves as a cage to operatively mount a plurality of balls 72 in the recesses. Two balls have been shown in FIG. 2 in order to illustrate that a plurality of such balls are carried by the cage 68 and that these balls are equally spaced around the periphery of the cage to provide a uniform distribution of the lifting forces exerted thereby when in operation; however, three balls 120° apart constitute a preferred arrangement. Ball cage 68 has an outer diameter which is sufficiently smaller than the internal diameter of the ball-engaging surface of barrel 58, within which it fits, to preclude any appreciable surface contact. The drive means include a connecting rod on lifting member 74 coupled by the clutch mechanism with holder 24, and the internal diameter of rear portion 64 of sleeve 62 is sufficiently larger than the external diameter of the portion of lifting member 74 which it surrounds, to prevent any appreciable frictional engagement therebetween.

Rigidly mounted on the forward end of lifting member 74 is a ball-engaging member 76 provided with a conic ball-engaging peripheral surface, the diameter of this surface decreasing in the direction of the lifting member. Member 76 may be secured to or integrally formed with lifting member 74 and, as shown, the forward end of lifting member 74 is expanded and engaged with member 76 where it is retained by a ring 78 to effect the desired union between the members.

Balls 72 are adapted to be engaged by the tapered surface of member 76 when the latter is moved in lift direction relative to cage 68 and this engagement forces the balls radially outwardly into engagement with the internal surface of barrel 58. This tends to lock together the ball-engaging members 76 and 58 and the elements secured thereto, namely, lifting member 74 and holder 24 and renders the connecting mechanism operative.

A coil spring 80 is engaged around rear portion 64 between forward portion 68 and disc 66 for biasing sleeve 62 forwardly in plunge direction with disc 52 cooperating with flange 66 to act as a limit stop fixing the foremost position of the sleeve. A main spring 82 is provided for biasing barrel 58, the holder, collet and stud coupled therewith in plunge direction. Spring 82 is held under compression between an internal shoulder 84 in barrel 58 and the forward surface of disc 52 and is retained in coaxial alignment by an annular lip 86 on disc 52. The foremost position of barrel 58 is determined by abutment of the barrel with base 40 of guide member 36.

The actuating means comprise a solenoid 88 for providing a lifting force to move barrel 58 rearwardly against the bias of main spring 82. Solenoid 88 comprises a movable core 90 coupled with lifting member 74 and tapered at its rear end at which is provided a recess for containing a spring 92; a solenoid coil 94 surrounding the movable core and housed in an annular metallic structure comprising an inner cylindrical sleeve 96, for example, of brass, an external sleeve 98, for example, of steel, a forward plate 100, and a rear end wall 102; and a stationary core 104 formed with a recess 106 in its forward end for engaging the tapered end of movable core 90 and spring 92. The stationary core 104, rear end wall 102 and outer sleeve 62 may be integrally formed as shown and inner sleeve 96 includes an internal bore for slidably receiving movable core 90.

When barrel 58 and sleeve 62 are in their forwardmost positions, the connecting mechanism is inoperative, i.e., balls 72 are inoperative to effect frictional engagement between barrel 58 and ball engaging member 76. The forwardmost position of member 74 is determined by abutment of movable core 90 against flange 66 limiting forward motion of member 74 relative to sleeve 62. Thus, so long as member 76 is in its forwardmost position with core 90 held against flange 66 by spring 92, and with flange 66 held against disc 52 by spring 80, holder 24 is free to move in either direction relative to the lifting member. Springs 80 and 92 are designed to exert forces just sufficient to retain sleeve 62 and the movable core lifting member in the inoperative positions described.

The stud welding gun is shown in lift position with movable core 90 in its rearmost position and flange 66 engaging the movable core. However, at the beginning of a stud welding cycle, holder 24 is in its foremost position in plunge direction, being held in this position by spring 82. Under the influence of spring 80, sleeve 62 and the balls carried thereby are also urged into their foremost position in plunge direction; and similarly, movable core 90 is biased by spring 92 in the same direction. In this position at the start of a welding cycle, holder 24 is free to be moved axially against the bias of spring 82 and is displaced initially as the stud, held by collet 26, and an arc shield held by foot 39, are pressed against the workpiece. To precisely control the lift of the stud and prevent overtravel of holder 24 relative to lifting member 74, flange 66 of sleeve 62 is so formed and mounted in relation to the lifting member and forward plate 100 that, during the lift, the flange engages the end plate arresting lift movement of the sleeve. Upon energization, solenoid 88 moves members 74 and 76 in lift direction while sleeve 62 continues to be biased in plunger direction by spring 80 and, as a result, when member 76 has moved a predetermined, constant short distance in lift direction, balls 72 frictionally engage and become wedged between the conic surface of member 76 and the inner cylindrical surface of barrel 58. This locks together lifting member 74 and holder 24 and begins the lift of the latter. The lift is terminated when flange 66 abuts forward plate 100 of the solenoid and renders more positive the locking engagement between holder 24 and lifting member 74. The elements are held in this position (shown) for as long as the solenoid remains energized. Upon the deenergization of the solenoid coil, holder 24, barrel 58, sleeve 62 and member 74 are moved in plunge direction under the influence of their respective springs and the stud held by the collet in holder 24 is plunged into engagement with the workpiece, completing the weld.

It is to be observed that adjustment of the total lift may be obtained by adjusting the position of plate 100, but that such adjustment does not affect the aforementioned sequence of operations because the axial position of plate 100 is fixed with respect to the axial position of stationary core 104. By having sleeve 62 engage and be positively stopped before lifting member 74 engages any stop, the arresting force is transmitted through the sleeve to balls 72 in a direction which tends to augment the wedging action between the ball-engaging surfaces of elements 58, 68 and 76. Holder 24 is thus rigidly secured through barrel 58, balls 72 and member 76 to lifting member 74 and any over-travel of holder 24 relative to member 74 is prevented.

As noted above, the length of lift movement of holder 24 is determined by the axial position of solenoid 88, particularly end plate 100 which functions as a limit stop for flanges 66 on sleeve 62. The gun accordingly includes means for predeterminedly adjusting the axial position of the solenoid comprising a control knob 108 mounted coaxially for rotation on the outer end of plug 56, and including a shank 110 journalled in and extending through a bore 112 in plug 56. Knob 108 is preferably formed of an electrically non-conductive material such as the same material as the housing and shank 110 is formed with an axial threaded hole 114 and end wall 102 of the solenoid assembly is provided with a threaded stud 116 threaded into hole 114. Knob 108 is movable radially (rotatable) but fixed against movement in an axial direction, while the solenoid is mounted for axial movement and restrained against radial movement by such means as a radial projection 118 on end wall 102 engaged for sliding movement in an axial slot in sleeve 54. By mounting the solenoid so that it is not rotated but only moved axially by rotation of knob 108, adjustment of the knob leaves unaffected the electrical connections, e.g., wires 122, made to the solenoid through external sleeve 98.

The operating mechanism of the gun also includes novel and improved mechanical means for controlling the rate of axial movement of holder 24 in both lift and plunge directions, so that with a simple and easily made adjustment it is possible to control the speed as well as the distance through which holder 24 is moved during initial lift by contact with the workpiece, lift by the solenoid and the plunge due to the bias of main spring 82. These means include the provision of air seals between barrel 58 and sleeve 36 so that the barrel functions as a piston and the sleeve as a cylinder. One of these seals comprises O-ring 46 which is engaged around shank 60 of the barrel and a second O-ring 124 engaged in a peripheral groove or channel 126 in barrel 58 between the latter and sleeve 36. The housing is provided wtih a radial bore 128 communicating with the annular chamber provided by recess 48 in sleeve 36 and the inner wall of the main bore, allowing air to pass through the recess, through ports 50 in the sleeve into and from the space between base 40 of sleeve 36 and the base or shank of the barrel. The speed of movement of holder 24 is controlled by metering the flow of air through bore 128 by a simple valve comprising an axial bore 130 formed in the housing intersecting bore 128 and a valve member 132 slidably engaged in bore 130 in closing relation to bore 128. Valve member 132 is tapered slightly and biased outwardly (into an open position) by a spring 134 within bore 130 and an adjusting screw 136 is threaded into bore 130 for determining the position of valve member 132 so as to meter air through bore 128 at a controlled rate.

The welding gun of the invention is designed for use with a control and energization circuit for the type disclosed in U.S. Patent No. 3,100,833, issued Aug. 13, 1963, in the name of Ralph K. Ritter et al., comprising a welding current power supply, means for controlling the operation of the gun, specifically energizing the solenoid for a predetermined period during a welding cycle, and means for controlling the flow of both pilot arc and welding current and coordinating the current flow with gun operation. The gun itself controls the length of lift and the velocity of movement of the stud during both lift and plunge; and includes a trigger 138 projecting from the upper portion of handgrip 16 coupled with a trigger switch 140 mounted within recess 19 in the handgrip for initiating a welding cycle. Also disposed in the handgrip of the housing are four relatively small electrical cables, two to the trigger switch and two to the solenoid, terminating in a conventional electrical connector at the end of the handgrip. To operate the gun, the operator presses the stud held in collet 26, against the workpiece displacing holder 24 rearwardly slightly and then squeezes the trigger to initiate a welding cycle which is substantially automatic thereafter. The gun construction permits the operator, by varying the extent and velocity of lift and plunge, to adjust the gun for optimum operation without returning to the control apparatus which may be remote from the location of the welding operations and the only tool required to do so may be a screw driver. The handgrip itself is easy and less fatiguing to hold and this coupled with the protection afforded by the guard makes possible more frequent welding cycles over longer periods.

Since certain changes may be made in the above apparatus without departing from the scope of the invention

I claim:
1. In a hand-held and operated electric arc stud welding gun comprising a housing formed of an electrically nonconducting material and including a barrel section having an axial bore containing the operating components of said gun including stud-holding means movable axially within said bore in lift and plunge directions, resilient means biasing said stud-holding means forwardly in plunge direction and electrically energized actuating means for moving said stud-holding means rearwardly in lift direction, in combination:

a hand grip formed integrally with said barrel section of said housing and extending radially from said barrel section intermediate the ends thereof and at an angle toward the rear of said housing;

an elongated guard member formed integrally with said barrel section of said housing, extending from said barrel section at a point thereon near the forward end thereof and spaced from said hand grip generally parallel with said hand grip;

a first welding current conductor immovably engaged within said guard member, coupled at the free end of said guard member with an electrical connector and extending through the length of said guard member to a point adjacent the forward end of said barrel section;

a second relatively short welding current conductor, flexible in one plane, connected at one end with said first conductor and at its other end with a portion of said stud-holding means projecting forwardly from said barrel section, said second conductor being disposed substantially entirely outside of said housing;

an electrically nonconductive covering for said first conductor;

a flexible electrically nonconductive covering for the second conductor; and means for controlling the velocity of movement of said stud holding means.

2. The stud welding gun of claim 1 in which said housing including said hand grip and said guard member is molded, and said first conductor is substantially rigid and is molded into said guard member.

3. The stud welding gun of claim 1 in which said second conductor is flexible in a single plane containing the axis of said bore and said stud-holding means and is accurately curved in said plane.

4. The stud welding gun of claim 1 in which said hand grip and said guard member are coupled at their free ends and are spaced from one another by a space sufficiently wide to permit freedom of movement of an operator's hand and fingers.

5. The stud welding gun of claim 1 including a trigger projecting forwardly from said hand grip adjacent said barrel section; a switch actuated by said trigger contained within said hand grip and coupled with means for controlling a welding cycle and energizing said actuating means; and electrical conductors enclosed within said hand grip coupled with said actuating means, said switch and an electrical connector at the free end of said hand grip, the last-mentioned conductors being capable of carrying relatively little current as compared with the current carrying capacity of said welding current conductors.

6. The stud welding gun of claim 5 including:

a stationary guide member including a cylinder having an end wall with an axial bore therethrough;

a clutch member including a first section engaged for sliding movement in lift and plunge directions in said cylinder and a shaft coupled with said stud-holding means extending through said axial bore;

first gas-sealing means mounted on said first section in gas-tight engagement with said cylinder;

second gas-sealing means mounted on said guide member within said bore in gas-tight engagement with said shaft;

said cylinder being formed with ports adjacent said end wall for admitting air into said cylinder from the exterior of said gun and allowing air to escape from said cylinder to the exterior of said gun, said ports being located intermediate said first and second gas-sealing means; and means for controlling the rate of flow of air through said ports between said cylinder and the exterior of said gun to control the rate of axial movement of said clutch member relative to said guide member in lift and plunge directions.

7. The stud welding gun as defined in claim 6 comprising a housing including a bore; said guide member being engaged in fixed position within the last-mentioned bore; said housing cooperating with said guide member to provide an annular chamber surrounding said guide member, said ports opening into said chamber; and the last-named means including a conduit in said housing communicating between said chamber and the exterior of said housing and means for controlling the rate of flow of air through said conduit.

8. The stud welding gun of claim 1 including:

a stationary guide member having a cylindrical section engaged in fixed position within said bore and a base, said base being formed with a bore of substantially smaller diameter than the inside diameter of said cylinder section and concentric therewith;

a coupling member including a piston section engaged for axial sliding movement within said cylindrical section and a concentric shaft engaged for sliding movement in said bore in said base, said coupling member being releasably coupled at said cylindrical section with said actuating means and said shaft being coupled with said stud-holding means, movement of said coupling member in plunge direction being limited by abutment with said base;

first gas-sealing means mounted on said coupling member for movement therewith and engaged with said cylindrical section to form a substantially gas-tight seal between said piston section and said cylindrical section;

second gas-sealing means mounted on said guide member within said bore in said base in engagement with said shaft to form a substantially gas-tight seal between said guide member and said shaft;

said housing cooperating with said cylindrical section of said guide member to provide an annular chamber having said cylindrical section as one wall thereof;

said cylindrical section being formed with radially spaced ports extending from said chamber into the interior of said cylindrical section at locations adjacent said base between the latter and said first gas-sealing means for passing air between said chamber and the space between said base and said coupling member; and control means for passing air at a controlled rate between said chamber and the exterior of said housing during movement of said coupling means in lift and plunge directions.

9. The stud welding device of claim 8 in which said cylindrical section is closely engaged within said bore in said housing and includes a peripheral recess in its outer surface cooperating with said housing to define said chamber and enlarged sections in gas tight engagement with said housing; and said control means include a radial bore through said housing from the exterior thereof into said annular chamber and adjustable means within said radial bore for controlling the rate of flow of air through said radial bore.

10. The stud welding device of claim 9 in which said resilient means include a spring compressively engaged with said coupling member for biasing said coupling member in plunge direction.

References Cited

UNITED STATES PATENTS

| | | | |
|---|---|---|---|
| 1,240,901 | 10/1917 | Symons | 219—143 |
| 2,640,133 | 5/1953 | Ainsworth et al. | 219—98 |
| 3,010,433 | 11/1961 | Codling | 92—12 X |
| 3,109,283 | 11/1963 | Sawyer | 92—12 X |
| 3,242,307 | 3/1966 | Mowry et al. | 219—98 X |

FOREIGN PATENTS 677,605  8/1952  Great Britain.

RICHARD M. WOOD, *Primary Examiner.*

J. G. SMITH, *Assistant Examiner.*